2,801,326

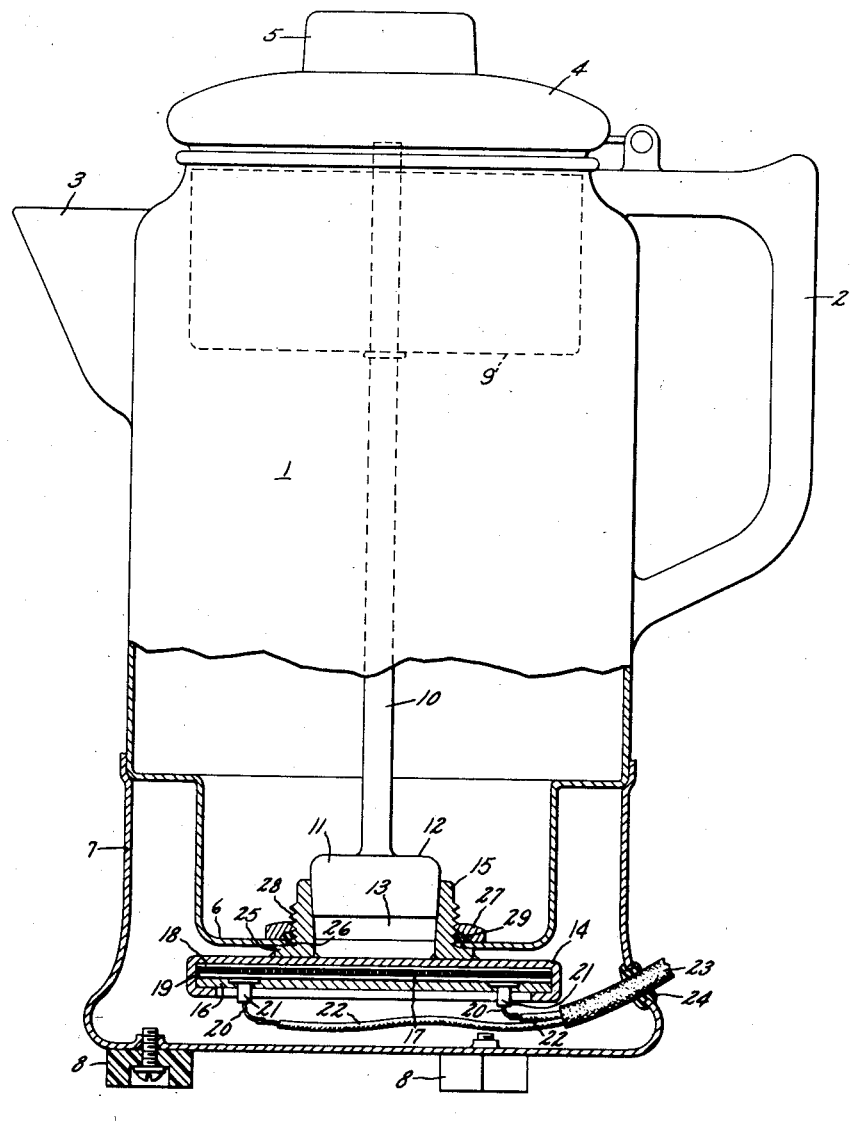

PERCOLATOR HEATER

Earle C. Sullivan, Bridgeport, Conn., assignor to General Electric Company, a corporation of New York Application April 28, 1953, Serial No. 351,543

1 Claim. (Cl. 219—44)

This invention relates to electrical liquid-heating vessels of the type having a heated pumping pocket or well, and is directed particularly to an improved construction of a pumping well in a coffee percolator or the like. The heating arrangement for the pumping well is the portion involved in this invention.

Percolators of the type to which this invention is directed include a pot or vessel with a bottom wall, in the center of which a pumping well or pocket is provided. An electrical heating element outside of the pumping pocket is designed to heat water or other liquid after it enters the pocket so that the liquid is forced upwardly through a percolator up-tube located immediately above the pocket. To insure rapid and economical operation, the pumping well preferably is made of a material having a high thermal conductivity so that the water in the pocket is raised to pumping temperature as rapidly as possible by the heating element and is kept at raised temperature while the heater is operating.

However, in operation of a percolator in which the entire pumping pocket is made of high thermal conductivity material, it has been found that a substantial amount of heat is wasted in heating the bottom wall of the vessel proper outside of the pumping well.

In carrying out the objects of this invention in one form the side walls of the pumping pocket of a percolator are made of a material having a low thermal conductivity compared to the material of the bottom of the pocket, heat is arranged to be applied below the bottom wall only of the pocket, and a path of relatively poor thermal conductivity is provided between the heater and the bottom proper of the vessel. It has been found that with this arrangement, heat is concentrated on the bottom wall of the pumping well and is kept from the side walls of the well and from the bottom proper of the percolator, and a desirable increase in efficiency of operation of the percolator is thereby obtained. Other objects and further details of that which is believed to be novel and included in this invention will be clear from the following description and claim taken with the accompanying drawing in which is illustrated an example of percolator embodying the present invention and incorporating the improved pumping pocket.

In the drawing the single figure is a side elevation of a percolator with parts broken away for clarity in illustration. The percolator has the usual body or pot 1, with a handle 2, pouring spout 3, and removable cover 4, with glass deflector or spreader 5. There is a bottom wall 6 on the vessel and there may be provided an ornamental enclosing and supporting base 7 with heat insulating legs 8 secured thereto.

Inside of the pot is the usual perforated coffee basket or strainer 9 supported on the top end of an up-tube 10 which in turn is supported from a pump 11. This pump may be provided with the usual holes (not shown) on the top wall 12 thereof, these holes being sometimes closed by a valve (not shown) located inside the pump. The valve closes the holes when pressure or direction of flow of water in pumping well 13 is correct for pumping to take place.

The pumping well 13 is of flared open cylindrical form at its top, closely but detachably fitting the tapered bottom of the pump 11. All of these elements are of conventional form and their shapes form no part of my invention. Obviously, in place of the pumping structure shown, the pumping well could be of the type which has an outer tapered top wall, which seats within an open flared end of a pump, this being a construction also common in the art. In either case, the details of the bottom of the well and its association with the heating element and the bottom of the vessel are of more importance in this invention.

The pumping well is made of two principal members, a horizontal bottom plate 14 forming the bottom of the well and a vertical hollow cylinder 15 forming the side walls of the well, against the top of which the pump member seats and seals at its sides.

The bottom plate is formed of material having high thermal conductivity, such as copper. It is preferably a circular disk with edges turned down and rolled in under a pressure plate 16 which may also be of copper. A heating element 17, of the wound resistance type, is firmly held and clamped between the bottom plate and the pressure plate, but is insulated from the plates as by mica sheets 18 and 19 in a manner readily understood. Electrical leads 20 from the resistance wire of the heating element are brought through small holes in the insulating sheet below the resistance element and are insulated from the metal pressure plate by passing through small insulating collars 21 which may have flanges, as shown, countersunk in the top face of the pressure plate to hold them in place. The ends of wires 22 from the usual cord set 23 are soldered or otherwise secured to the heater terminals 20 and the cord is brought outside of the enclosing base through a grommet 24 for connection to a suitable source of electric power (not shown).

The sides of the pumping well are made of a material having relatively low thermal conductivity, compared to the material of the bottom plate of the well. Such a material may be stainless steel. At the bottom of the stainless steel cylindrical side walls, an outwardly turned flange 25 is provided, which assists in joining the sides to the bottom of the well and serves as a spacer between the bottom 6 of the vessel and the top of the heating element assembly. The side wall member and the bottom plate of the well as jointed together in fluid-tight relation by brazing, welding, or any other suitable manner. Any way of joining these pieces together is obviously acceptable if a fluid-tight joint is obtained which will not open under the heat encountered during operation of the percolator.

The upper portion of the side walls of the pump well passes through a central opening 26 in the bottom of the vessel and extends some distance above the bottom wall 6. The side wall cylinder 15 of the pumping well is the only portion of the well which touches the bottom wall of the vessel, and the well may be secured to the vessel as by a mounting nut 27 which cooperates with a threaded portion 28 on the outside of the side wall cylinder, within the coffee pot. A packing washer 29 may be used under the mounting nut to obtain a fluid seal between the outer walls of the well and the opening 26 in the vessel bottom wall. When the nut is tightened, the bottom wall of the vessel will be firmly clamped between the nut and packing above and the spacing flange 25 below.

In operation of the percolator, the coffee basket or strainer is provided with coffee, water is placed in the pot, and the pump is placed on the pumping well, supporting the up-tube and the loaded basket above the water. The cover is placed upon the pot and the heating unit is then connected to the power source. Thereupon the water in the pumping well is heated until pressure forces it up the up-tube and it is spread over the coffee in the basket by striking against the glass deflector or spreader in the cover of the pot. The liquid filters down through the coffee and returns to the pot in the space outside the pumping well. Meanwhile, the valve in the pump has allowed more water to enter the pumping well, where it is heated as before. The cycle is continued until the resulting brew is the desired strength. When it is desired to stop percolation, current to the heating element is shut off, either manually or automatically by any desired mechanism, slightly before the percolating is to be stopped.

As a result of the construction described here, it will be seen that the water at the bottom of the pumping pocket will be heated rapidly by the heating element and pumping will start in a short time after current is applied to the element. The low thermal conductivity of the side walls of the pumping well will minimize the heat conducted to the bottom of the vessel outside of the pumping well and will minimize transfer of heat from the outside walls of the well to the surrounding water. The out-turned flange on the bottom edge of the side walls of the pumping well serves further to provide a poor heat conducting path to the bottom of the vessel from the heater and spaces the heater from the bottom of the vessel, thus assisting in the desired effect.

As will be evident from the foregoing description, certain aspects of this invention are not limited to the particular details of construction of the example illustrated, and it is contemplated that various and other modifications and applications of the invention will occur to those skilled in the art. It is, therefore, intended that the appended claim shall cover such modifications and applications as do not depart from the true spirit and scope of this invention.

What I claim as new and desire to secure by Letters Patent of the United States is:

A percolator comprising a vessel having a bottom, an opening in said vessel bottom, a pumping well in said opening and secured to said vessel bottom, said well having a flat bottom wall formed of metal having high thermal conductivity and upstanding cylindrical side walls, said well side walls being secured at their bottom ends to said well bottom wall in fluid tight relation, a spacing flange secured to said well side walls and extending radially therefrom, said spacing flange being disposed between and contacting said vessel bottom and said well bottom wall whereby said vessel bottom is spaced from said well bottom wall, said well side walls and said spacing flange being formed of metal of relatively low thermal conductivity compared to the metal of said well bottom wall, said well side walls having a major portion thereof extending into said vessel and being disposed above said vessel bottom, and heating means disposed below said well bottom wall.

References Cited in the file of this patent

UNITED STATES PATENTS

| | | |
|---|---|---|
| 1,227,721 | Wilkinson | May 29, 1917 |
| 1,412,735 | Halle | Apr. 11, 1922 |
| 1,475,334 | Warner | Nov. 27, 1923 |
| 1,816,994 | Armstrong | Aug. 4, 1931 |
| 1,916,369 | Harpster | July 4, 1933 |
| 2,211,520 | Smith | Aug. 13, 1940 |
| 2,213,723 | Smith | Sept. 3, 1940 |